United States Patent
Berg et al.

(10) Patent No.: US 10,207,722 B2
(45) Date of Patent: Feb. 19, 2019

(54) AUTOMATED MACHINING AND WELDING OF RAILWAY CAR PARTS

(71) Applicant: Strato, Inc., Piscataway, NJ (US)

(72) Inventors: Thomas R. Berg, Saint Louis, MO (US); Christopher J. Clark, Hoboken, NJ (US); Thomas J. Heyden, Arlington Height, IL (US); Kevin P. McGarvey, Piscataway, NJ (US); Michael Fortier, Rochester, NH (US)

(73) Assignee: STRATO, INC., Piscataway, NJ (US)

( * ) Notice: Subject to any disclaimer, the term of this patent is extended or adjusted under 35 U.S.C. 154(b) by 354 days.

(21) Appl. No.: 15/243,328

(22) Filed: Aug. 22, 2016

(65) Prior Publication Data

US 2018/0050708 A1 Feb. 22, 2018

(51) Int. Cl.
*B61F 5/52* (2006.01)
*B23Q 3/155* (2006.01)
*G05B 19/402* (2006.01)
*G05B 19/18* (2006.01)

(52) U.S. Cl.
CPC .............. *B61F 5/52* (2013.01); *B23Q 3/155* (2013.01); *G05B 19/182* (2013.01); *G05B 19/402* (2013.01); *G05B 2219/39132* (2013.01); *G05B 2219/45104* (2013.01); *Y10S 901/42* (2013.01)

(58) Field of Classification Search
CPC ....... B61F 5/52; B62D 65/026; B23K 1/0056; B23Q 3/155; G05B 19/402
See application file for complete search history.

(56) References Cited

U.S. PATENT DOCUMENTS

| | | | |
|---|---|---|---|
| 4,187,600 A | * | 2/1980 | Yeates ............... B23C 3/00 29/564 |
| 4,190,390 A | * | 2/1980 | Yeates ............... B23C 3/00 29/48.5 R |
| 5,783,921 A | | 7/1998 | Handa et al. |
| 6,071,031 A | | 6/2000 | Bailey |
| 6,240,799 B1 | | 6/2001 | Yau |
| 6,801,830 B1 | | 10/2004 | Tomita et al. |

(Continued)

FOREIGN PATENT DOCUMENTS

| | | |
|---|---|---|
| CN | 105577100 | 5/2016 |
| CN | 105666283 | 6/2016 |
| WO | WO1999038646 | 8/1999 |

OTHER PUBLICATIONS

International Search Report and Written Opinion for PCT International Application No. PCT/US2017/047327 dated Oct. 30, 2017.

*Primary Examiner* — Changhyun Yi
(74) *Attorney, Agent, or Firm* — Pearl Cohen Zedek Latzer Baratz LLP (57) ABSTRACT

A system and method for manufacturing and/or reconditioning side frames and bolsters for railway cars includes at least one robot adapted to access positions along the length of the part. A map of the part dimensions, which may be obtained by a probe or scanner on the robot(s), allows a processor to determine where welding and machining are required to meet certain dimensional tolerances, leveraging novel reference surfaces on the part which cannot be leveraged using conventional gauges. The robot(s) may locate and mount welding and material removal tools to carry out the welding and material removal operations determined by the processor.

17 Claims, 6 Drawing Sheets

(56) References Cited

U.S. PATENT DOCUMENTS

| | | | |
|---|---|---|---|
| 7,395,606 B2 | 7/2008 | Crampton | |
| 8,965,556 B2 | 2/2015 | Oe et al. | |
| 2004/0014405 A1* | 1/2004 | Boms | B23B 5/32 |
| | | | 451/63 |
| 2004/0265078 A1* | 12/2004 | Boyl-Davis | B23B 39/14 |
| | | | 408/1 R |
| 2010/0161123 A1 | 6/2010 | Ando et al. | |
| 2011/0174793 A1* | 7/2011 | Shiraga | B25J 9/0084 |
| | | | 219/136 |
| 2012/0138207 A1 | 6/2012 | Ortlieb et al. | |
| 2014/0259614 A1* | 9/2014 | Doll | B62D 65/022 |
| | | | 29/430 |
| 2015/0001186 A1* | 1/2015 | Ryu | B25J 15/0066 |
| | | | 219/86.24 |
| 2015/0034607 A1* | 2/2015 | Mori | B23K 11/115 |
| | | | 219/86.1 |

* cited by examiner

AUTOMATED MACHINING AND WELDING OF RAILWAY CAR PARTS

BACKGROUND OF THE INVENTION

The present invention relates to an apparatus and method for automated machining and welding of railway car parts, including side frames and bolsters, useful in connection with both manufacturing and reconditioning of such parts.

Current processes for manufacturing and reconditioning freight car side frames and bolsters involve intensive manual labor inputs. A conventional "hard" gauge made of precision steel is used to determine variance of a part from desired dimensions, and specially trained workers manually weld and grind the cast part to desired finished sizes and dimensions. Conventional gauges use generous tolerances, which in turn produce railway parts with minimal dimensional accuracy, resulting in poor truck assembly performance. Furthermore, the manual work presents a high risk of injury to workers, and high expense to employers having to sustain a trained workforce and provide compensation for risky activities and/or possible injuries.

Moreover, remanufacturing side frames and bolsters involves concentrating dedicated equipment and specialized expertise in a single location. Thus, transportation costs of delivering heavy railway car truck parts to a single location have made the commercial reconditioning processes economically unfeasible. Therefore, a portable system for these purposes would be desirable. However traditional machining (which refers herein to cutting metal with a tool so as to afford greater dimensional accuracy compared to grinding), generally requires secure mounting of the very large and heavy machinery to the ground to control vibration. Thus, designing a portable system for machining large, heavy parts with computer controlled robots poses significant challenges.

Further, using a physical gauge to compare and conform one surface of a railcar part to another limits the comparison to surfaces that are near each other. It would be desirable to leverage different dimensional reference points on a railway car part, such as a side frame or bolster, with the ability to compare and conform surfaces that are more distant to one another.

U.S. Pat. No. 4,187,600, incorporated by reference, teaches an apparatus for machining railroad truck bolsters, which includes a rotatable fixture for supporting a bolster while it is worked on. U.S. Pat. No. 4,190,390 to the same inventor, also incorporated by reference, discloses an apparatus for machining railroad truck side frames.

Although not heretofore used in connection with reconditioning railcar truck parts, robot positioning systems are known that use six jacks to rotate a tool about six axes: the x, y, z, pitch, roll and yaw axes. In various embodiments, these positioning systems are referred to as hexapods or Stewart platforms. Examples include the technology disclosed in U.S. Pat. Nos. 6,071,031 and 6,240,799, which are incorporated by reference. A hexapod, or the like apparatus, heretofore has not been used with combined welding and machining of large and heavy cast parts, such as a railway car side frame.

US Patent Application Publication No. US/2004/0014405, also incorporated by reference, describes a portable machining device used to reprofile wheels through lathing, broaching, milling, turn milling, grinding, and deep rolling operations without detaching the wheels from the railway car.

US 2015/0034607 and US 2010/161123, also incorporated by reference, disclose robots and systems for controlling them, which may be applied to certain welding applications.

US 2011/0174793, also incorporated by reference, describes a robot system having a positioner allowing for mobility and reduced footprint. U.S. Pat. No. 5,783,921, also incorporated by reference, describes a welding robot adapted for simplified installation and operation.

The prior art does not teach an automated system for initial inspection, welding, material removal and final part inspection for railway car truck parts that uses a hexapod robot on a rail system, or which can be transported from one installation location to another, or that leverages novel dimensional reference surfaces on the parts to improve overall tolerances and truck performance.

SUMMARY OF THE INVENTION

In one aspect, the invention is directed to an automated initial inspection, welding, material removal and final part inspection system for railway car truck parts that can be transported in standard enclosed trucks from one installation location to another.

In another aspect of the invention, a material removal tool is supported on a hexapod robot mounted on rails to access different areas along the length of a side frame or bolster. The hexapod robot can be adapted to locate and mount a measurement tool, one or more welding tools, and one or more material removal tools. Alternatively, a separate welding robot to mount the welding tool is used in combination with the hexapod robot which supports a material removal tool. A standard welding robot arm has a longer reach than the hexapod robot and the welding robot need not be mounted on rails.

An advantage according to some embodiments of the invention is that the hexapod robot is transported linearly on rails to obtain part dimensions, such that x, y, z coordinates for the welding and machining operations may be established with respect to the part, rather than with respect to the robot position. Most robots are provided with a fixed coordinate system, so that it is necessary to register carefully a workpiece with respect to the robot within tight tolerances to ensure proper alignment.

The use of a hexapod in the context of machining sideframes and bolsters is novel, in that the target tolerance achieved is intermediate that of conventional grinding and conventional machining. Typical machining applications hold tolerances to within a few thousandths of an inch or less, which requires the machines to be very stiff and intolerant of vibration. Use of a hexapod robot for machining in a high vibration environment according to the invention, achieves somewhat lower tolerances, between ±0.010 and ±0.060 depending on the feature, but still much tighter tolerances than can be achieved using grinding.

In embodiments, the invention is an apparatus for manufacturing and/or reconditioning a railway car part comprising: a material removal robot having a head adapted to mount a tool; a tool changer comprising a plurality of tools adapted to be mounted on the head, including at least one material removal tool; part positioning equipment adapted to support a railway car part and rotate the part around a longitudinal axis of the part; and a track adapted to translate the material removal robot (or the part positioning equipment) along the longitudinal axis of the part to position the tool at a plurality of positions along the entire length of the part. The apparatus includes a user interface adapted to be manipulated by a user and a computer readable medium adapted to contain a digital map of dimensions of the part. A processor is adapted to receive signals from the user interface, and from the digital map, and is adapted to determine a sequence of material removal operations and provide instructions to the material removal robot to carry out said material removal operations at a plurality of positions along the length of the part.

In particular embodiments, the digital map of part dimensions is obtained by scanning the part with a measurement tool mounted on the material removal robot, or other robot, such that the user interface, the computer readable medium containing the part dimensions, and the processor determining a sequence of material removal operations are all part of the same equipment. However, in some instances it is feasible to obtain a map of part dimensions with a separate apparatus, and provide the part dimensions on a computer readable medium for use by the apparatus for manufacturing or reconditioning.

In particular embodiments, the apparatus is provided with a welding tool, which may be mounted on a welding robot separate from the material removal robot, or mounted as a separate tool on the head of the material removal robot.

In another aspect, the invention is a method for reconditioning a railway car side frame or bolster, comprising: loading a railway car side frame or bolster onto automated part positioning equipment positioned to provide a welding tool head and a material removal tool head mounted on one or more robots access along the length of the side frame or bolster; measuring the side frame or bolster with an automated measurement tool mounted on said one or more robots and, using a processor, storing dimensions obtained from said measuring in memory; determining a sequence of welding and material removal operations to be performed; positioning the material removal tool head along a length of the side frame or bolster; and performing welding operations at a plurality of different positions along the length of said side frame or bolster.

In another aspect of the invention, an automated machining and welding system is enhanced by using reference measurements that cannot be obtained from a gauge to control precisely where to weld and cut to ensure tighter tolerances and improved overall truck assembly performance.

In still another aspect of the invention, the system and method are adapted to retrofit a side frame-bolster combination so that a transom according to U.S. Pat. No. 8,474,393, which is incorporated by reference, can be bolted and/or welded on an existing side frame.

The system according to the invention is mobile, reduces weld and machining time, scrap rate, workforce, avoids superfluous work, and is overall more efficient than existing processes.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

As used herein, "reference surface" and "reference surface combination" means that a surface on a side frame or bolster is used as a reference to govern the material removal or material addition to another surface on the side frame or bolster. Thus, two surfaces that are machined to be parallel are each a reference surface in a reference surface combination. Likewise, two similarly angled surfaces on opposite ends of a bolster machined to have the same slope to sit on a side frame are reference surfaces of a reference surface combination. Conventionally, a gauge was used to establish a reference between two nearby surfaces on a part for reconditioning. The automated system of the present invention allows more distant surfaces to be referenced for material removal and welding.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A "material removal robot" as used herein supports at least a material removal tool, but may also support a welding head at different times. Because welding involves less vibration than material removal, particularly machining, a hexapod robot is not necessary to mount a welding tool head. "Material removal" is used herein to encompass both grinding and machining. Grinding and machining utilize different tool heads, but the same, or substantially the same, robot can be used with the different tool heads. Therefore, "machining robot" and "material removal robot" are in effect used interchangeably. "Machining", as used herein, refers to shaping metal with a cutting tool, which is distinct from a grinding tool that removes material by abrasion.

A side frame or bolster each has a longest dimension, and as used herein, the "longitudinal axis" refers to the axis of the part along the longest dimension. In an assembled truck, the longitudinal axis of the bolster is perpendicular to the longitudinal axis of the side frame. Other directions, including "up", "down" and "side" are with reference to the orientation of a railcar in normal operation.

As used herein, a "plurality" means at least two; the indefinite article "a" is synonymous with "at least one".

Figure 1:
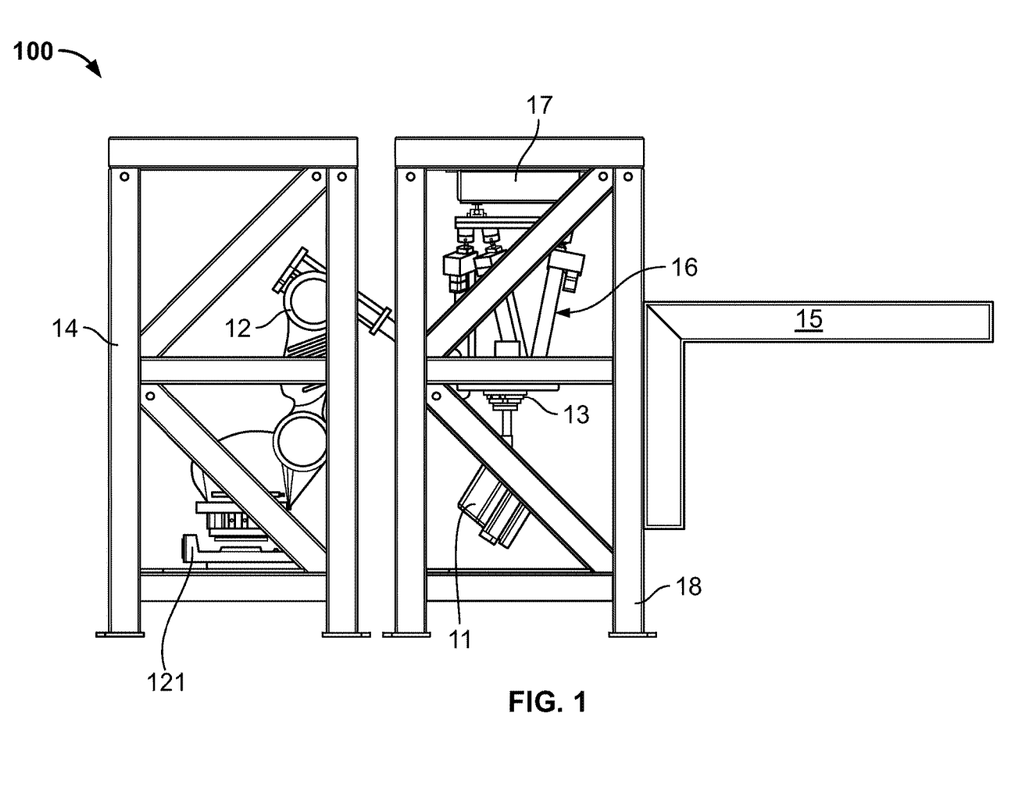
FIG. 1 is a schematic view of a welding and material removal apparatus according to an embodiment of the invention.

As depicted in FIG. 1, apparatus 100 includes welding robot 12 supported in welding robot frame 14 on a fixed base 121, and material removal robot 16 supported in adjacent material removal robot frame 18. Jib crane 15 may be used to move part 11 in and out between the frames, where part 11 is fixed to part-positioning equipment (also referred to as a trunnion), adapted to rotate the part about its longitudinal axis, giving robots 16 and 12 access to all sides of the part and along the length of the part.

Figure 2:
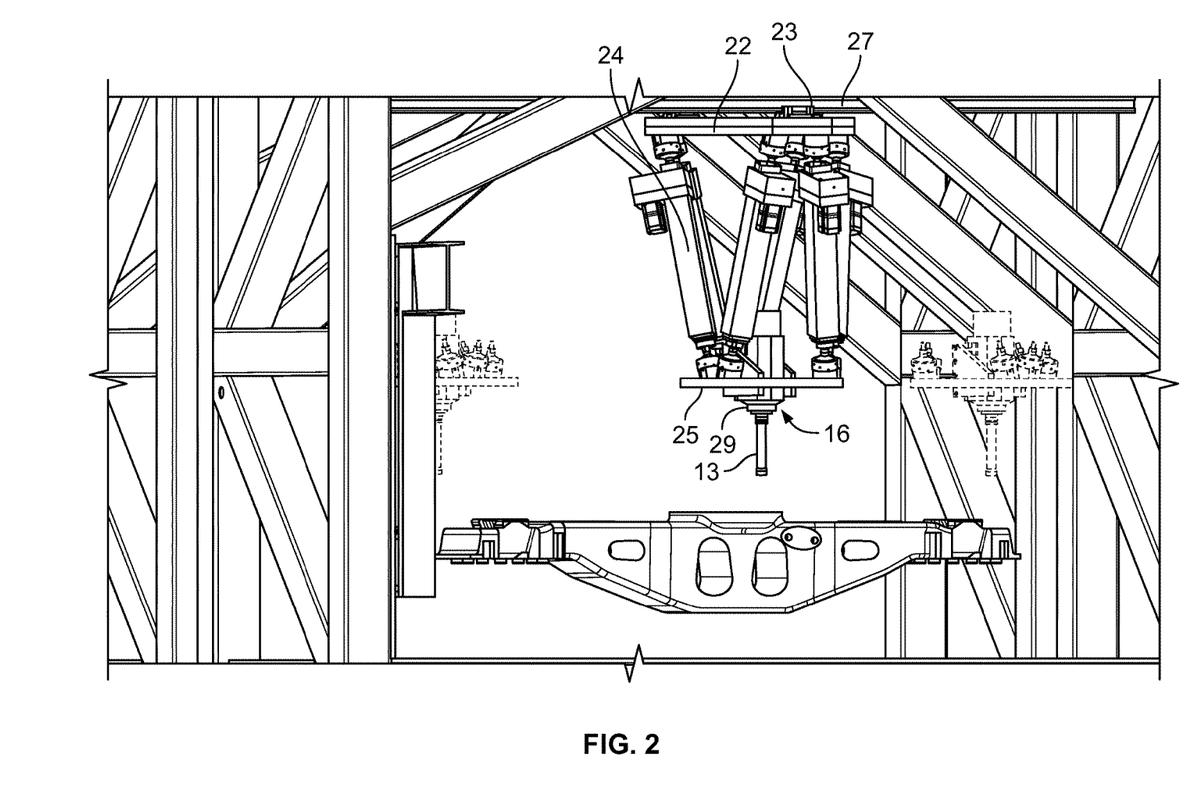
FIG. 2 depicts features of a material removal robot in a frame according to an embodiment of the invention.

FIG. 2 shows material removal robot 16 mounted on a track system, adapted to translate material removal robot 16 on rails 27 along the length of the railcar part, to allow a tool on tool head spindle 13 to access the entire part. In embodiments, the part positioning equipment may be translated, instead of the robot, to afford access to positions along the entire length of the part.

In the embodiment shown, frames 14 and 18 are provided side by side supporting a welding robot 12 and a machining robot 16, respectively. Frames 14, 18 are sized to accommodate a side frame within them, so dimensions on the order of 10 feet to 16 feet in length and 5 feet to 8 feet in width may be appropriate for the frames, but are not critical to operation. The frames are generally, but not necessarily, about the same size. Whereas a conventional milling machine uses gibs and ways to assist in accurately positioning a workpiece, which requires a large and very stiff foundation, frames 14, 18 according to the invention are shimmed and bolted directly to the existing floor, resulting in a reduced footprint and installation cost, facilitating the cost-effective transport and installation of the equipment at the location of the side frames and bolsters. In embodiments, frames 14, 18 have a footprint defined by a width no greater than 83 inches, and a length no greater than 166 inches. Some variation in these dimensions may be expected. In one aspect, the invention provides for transport of the entire apparatus 100 by standard truck transport.

In the embodiment shown, hexapod robot 16 is mounted on runners 23 above part 11, and welding robot 12 is level with or below part 11 to provide access to part 11 by both robots. In some embodiments, a single hexapod robot mounted in a single frame may be used, without a separate welding robot as discussed below.

In embodiments, as more clearly shown in FIG. 2, material removal robot 16 comprises a base 22, adapted to translate on bearings 23, running on rails 27 along the longitudinal axis of the sideframe or bolster. The dotted line portion of FIG. 2 shows the extent of movement of robot 16. Six actuators 24, in the form of jack screws, are attached at a first end to the machining robot base 22, and attached at an opposite end to a movable platform 25. The actuators 24 are mounted on the base and the positioning platform in sets of three pairs, each set of three pairs forming a triangle on base 22 and platform 25, respectively. This arrangement keeps the tool stable even when machining operations create significant vibration. The actuators 24 can become longer and shorter and cooperate with platform 25 to provide freedom of movement for the tool head 29 about six axes; x, y, z, pitch, yaw and roll axes, in addition to translation on rails 27.

A tool changer 35 (shown generically in FIG. 3) comprises a plurality of tools in an ordered array. In embodiments, the tool changer includes at least a measurement tool, such as a touch probe, light probe, or laser scanner. A measurement tool may also include, for example, a Brinell hardness measuring tool (to measure the material integrity of the casting), or like device(s) known in the art. The array of tools in the tool changer 35 may further comprise at least one material removal tool, such as a shell mill tool, face mill tool, drill tool, tap tool, and grinding head. Tool changer 35 is adapted to mount each one of the plurality of tools on material removal robot 16, receiving signals from processor 32 to locate the selected tool from an array. A welding tool may be included in the tool changer 35, and if only one robot is used, spindle head 13 on material removal robot 16 may be adapted to mount sequentially a welding tool and a measurement tool in addition to a material removal tool, so that welding, inspection, and material removal may be conducted with one robot.

Figure 3:
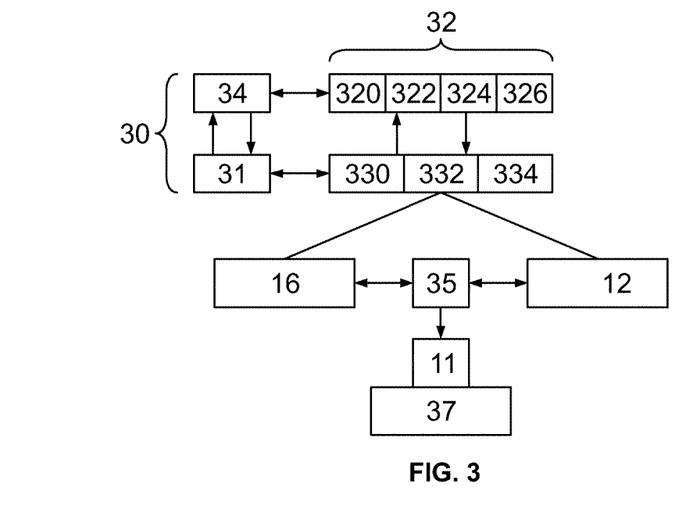
FIG. 3 is a schematic of a system and method according to an embodiment of the invention, including a processor and user interface for controlling measurement, material removal and welding operations by the robot(s) according to an embodiment of the invention.

FIG. 3 is a schematic of a system and method according to the invention, in which a user operates a user interface 30 adapted to be manipulated by a user via user input device 31 and having a display 34 adapted to be viewed by a user. User interface 30 typically comprises a personal computer or a touch screen, but in principle could comprise any input device having a processor 32 and a display 34, which permit a user to input information relating to the part or the reconditioning to be performed and to view information relating to the reconditioning process. The processor is adapted to determine a sequence of measurement, material removal and welding operations required to bring the part in conformance with specifications.

An algorithm for determining a sequence of measurement, material removal and welding operations for a side frame is as follows:

Algorithm for Reconditioning—Side Frame
Orient Part
    Primary datum is spring seat
    Secondary datum is thrust lug—Field side ends
    Third datum is thrust lug—inner (can be the inner (closest to the spring seat) lug on either end)
Develop Coordinate System Based on Part Centerlines
Evaluate Best Method of Welding and Machining
    Use the flattest column as the longitudinal reference.
    Determine the amount of machining and welding needed on all other longitudinal surfaces based on the assumption that the flattest column will be neither machined nor welded.
    If neither column meets flatness requirements, calculate the amount of material removal required to make the flattest column meet the flatness requirement. Use this calculated surface as the new longitudinal datum.
    Calculate the amount of machining and welding required based on the longitudinal datum and evaluate the results against industry and customer requirements. This can be done under the condition that the side frame window may or may not need to be centered between the pedestals. Centering of the side frame window is a customer selected option. Centering the side frame window was not done at initial manufacture and will likely result in much higher cycle times.

If the amount of welding and machining exceeds industry or customer requirements (both industry regulation and the customer impose limits on the amount of material that can be removed and rebuilt), the program shifts the longitudinal axis of the new machining datum down the length of the part until the issue is resolved.

Reevaluate the amount of welding and machining to determine the depth of weld and machining required on each surface. All surfaces will be reevaluated to determine compliance with industry and customer requirements. This process is repeated until all surfaces are within industry/customer requirements.

Based on the controller database of welding and machining speeds for various depths of material deposition or removal, an anticipated cycle time is estimated using the latest welding and machining plan. The controller then shifts the welding and machining profile down the length of the part in small increments to determine if cycle time increases or decreases. This process is repeated until the lowest cycle time is obtained and industry/customer material removal and rebuild requirements are met.

Once the optimum machine and weld pattern is obtained, the amount of material removal and build up for each surface may be displayed on the user interface. The rebuilding center will (as requested by the user) either wait for approval of the rebuilding plan or automatically execute the plan.

An algorithm for determining a sequence of measurement, material removal and welding operations for a bolster is as follows:

Algorithm for Reconditioning—Bolster

Orient Part
  Primary datum is spring seats
  Secondary datum is the longitudinal center line as defined by the center of the four friction casting pocket slope surfaces.
  Third datum is the lateral centerline created by two planes perpendicular to the first two datums which passes through the axis of the centerbowl.

Develop Coordinate System Based on Part Centerlines

Evaluate Best Method of Welding and Machining
  Based upon these datums, calculate the amount of weld deposition and material removal.
  Compare the amount of material (application or removal) against industry and customer requirements.
  If the amount of material exceeds requirements, adjust the datums to remove this noncompliance.
  Once the adjustment reaches a point of compliance, calculate the cycle time.
  Next, assess small adjustments in the datums will be assessed to determine if they yield an improvement in cycle time.
  If adjustments reduce cycle time, the adjustments will continue until cycle time is minimized. Each time an adjustment is made, it will be evaluated against the industry and customer limitations. If the limits have been exceeded, the previous welding/machining plan will be used. If they have not been exceeded, the cycle time optimization will continue. This will proceed until the optimum cycle time that creates a part within industry and customer limits is obtained.
  Once the optimum machine and weld pattern is obtained, the amount of material removal and build up for each surface may be displayed on the user interface. The rebuilding center will (as requested by the user) either wait for approval of the rebuilding plan or automatically execute the plan.

In the foregoing, it may be noted that a coordinate system governing the welding and material removal operations is defined with respect to landmarks on the part. "Industry limitations" may include dimensional requirements established by AAR standard, or a less formal accepted industry standard. "Customer limitations" may include preferences, such as allowed cycle time to complete a sequence of operations.

In embodiments, a map of part dimensions is obtained by a measurement probe mounted on material removal or welding robot head, and resides at least temporarily in a computer readable medium accessible by the processor. However, as the coordinate system is obtained with respect to the part, and not with respect to the robot, the map of part dimensions may also be separately obtained in a separate apparatus and the information stored on a computer readable medium for access by the processor.

User interface 30 and processor 32 may each include one or more controller(s) or processor(s) 320, 322, 324 and 326, respectively, for executing operations and one or more memory unit(s) 330, 332 and 334, respectively, for storing data and/or instructions (e.g., software) executable by a processor, including part dimensions, updated part dimensions, and a sequence of welding and material removal operations. Processor(s) 320, 322, 324 and 326 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 330, 332, 334 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Processor 32 communicates with a user via user interface 30 and with welding robot 16 and/or material removal robot 12 to select and mount a tool from tool changer 35 and communicates material removal and welding operations to be performed by robots 12, 16 on part 11 mounted on part-positioning equipment 37.

To conduct a reconditioning method according to embodiments of the invention, a railway car side frame or bolster is loaded onto automated part-positioning equipment 37, such as a trunnion, using a jib crane 15, affording robots 16, 12 access along the length of the side frame or bolster. Welding robot 12 and/or material removal robot 16 must be controlled so that the respective mounted tool is accurately positioned with respect to part 11 at an appropriate position. For this purpose, information about the rotational position of the part and the position of material removal robot 16 on the track along the length of the part may be communicated to processor 32. The part may also have indicia thereon adapted to be read by a scanner or like device which includes information about the part. However, fine positioning of the robot requires feedback from a landmark on the part, from the measurement tool. The measurement tool, which may be a touch probe or a laser scanner, for example, may be selected and located from tool changer 35 and mounted on either material removal robot 16 or welding robot 12. After part 11 is secured to part positioning equipment 37, the measurement tool may be used by either of the robots to locate key surfaces. This information is communicated to the processor 32.

Dimensions prior to and after material removal and welding operations may be stored by processor 32 in memory 330, 332, 334 and/or used to update indicia affixed to part 11. Indicia may include a bar code, and in embodiments a tool may be provided to engrave or etch indicia on the part based on instructions from the processor.

After orientation, processor 32 determines desired dimensions such as (a) spring seat centering dimensions of a side frame; (b) pedestal-to-pedestal dimensions of a side frame; (c) width and/or depth and/or angle of a bolster friction pocket in relation to the other pockets; (d) the relationship between the bolster friction casting pockets and the bolster bowl and side bearing; and (e) orientation of the lands to the friction casting pockets at opposite ends of the bolster, all of which are novel dimensional reference surfaces and/or reference surface combinations, as discussed in more detail below.

In embodiments, a plurality of desired dimensions and reference surfaces, together with a sequence of welding and material removal operations are determined by processor 32. Once the sequence of operations is determined, welding robot 12 will reach into the frame and begin adding material where necessary. Once welding robot has finished a region of the casting, material removal robot 16 comprising the hexapod support may begin machining if the two robots can operate simultaneously. If not, robot 16 will wait until it will not interfere with welding robot 12. Once the sequence of operations is completed, key surfaces of the part are again probed and measured to ensure that the part meets specified dimensions within a selected tolerance. After it has been determined that the part meets tolerances, a bar code sticker, for example, may be printed and affixed to uniquely identify the part. In lieu of a bar code sticker, the information may be engraved directly onto the part. Thus, processor 32 must communicate sufficient information to robots 12, 16 to allow the robot(s) to locate and mount a tool from the tool changer 35; carry out welding and machining operations at a plurality of positions along the length of the part; record the sequence of operations in memory; and record initial and updated dimensions of the part in memory.

One aspect of the invention is the development of dimensional reference surfaces and reference surface combinations that may be stored, updated and used to determine a sequence of material removal and welding operations leading to tighter tolerances and improved truck performance.

In general, a part according to the invention is reconditioned to ensure that the part complies with AAR Standard M-214 for a side frame or bolster. However, many dimensions that are not specified by AAR M-214 may be advantageously leveraged to improve truck performance.

For example, centering of the spring nest in the side frame is historically uncontrolled by industry regulations. Improper centering may result in the bolster not being square to the side frame, which affects performance of the vertical damping system and the ability of the bolster/side frame connection to resist forces tending to force the truck out of square alignment. If the angular relationship between side frame and bolster begins to change cyclically, very high lateral loads on the wheels and rail may result, which in turn results in accelerated wear and may be a safety concern.

Historically, pedestal to pedestal (wheel base) distance in side frame manufacture and reconditioning has been controlled within certain tolerances using six "buttons" or protrusions cast into the side frame. The nominal wheel base for a standard side frame is 70 inches. A button has a height of 0.075 inches. A side frame with a wheel base that is within a 0.075 inch window of 70 inches will have 3 buttons. For every 0.075 inches that the side frame varies from 70 inches, a button is either removed (if shorter than 70 inches) or added (if longer than 70 inches). When paired for truck assembly, side frames are allowed to be mismatched by 1 button. However, if the side frame on one side of the truck has a wheel base that is longer than the opposite side frame, the axles will have a tendency to be non-parallel. Therefore, if one side frame is a 3 button and one is a 2 button, they could have nearly a 0.150 inch wheel base difference. Due to clearance in the pedestals, the axle may align to follow a straight track even with the wheel base difference, but the truck may curve better in one direction (e.g., counter clockwise) than in the opposite direction (e.g., clockwise). In this light, the invention seeks to develop new reference surfaces for ensuring that the side frame meets specifications within stringent tolerances.

Figure 4C:
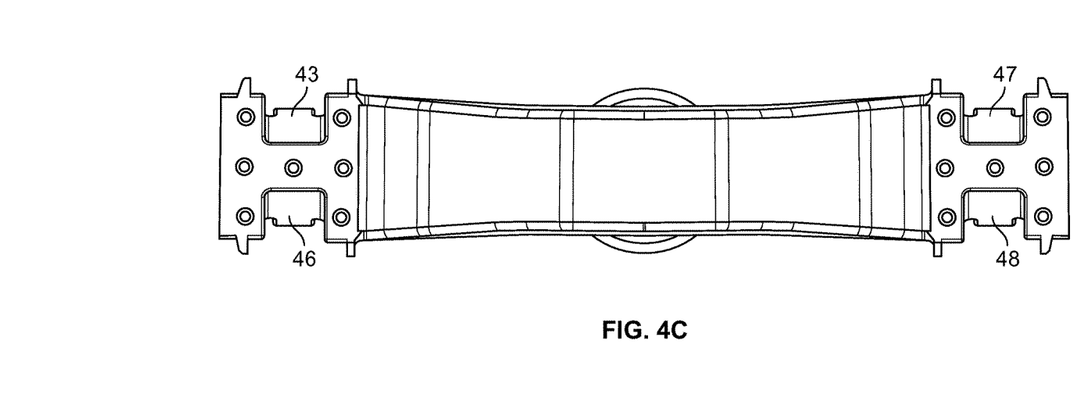
Figure 5A:
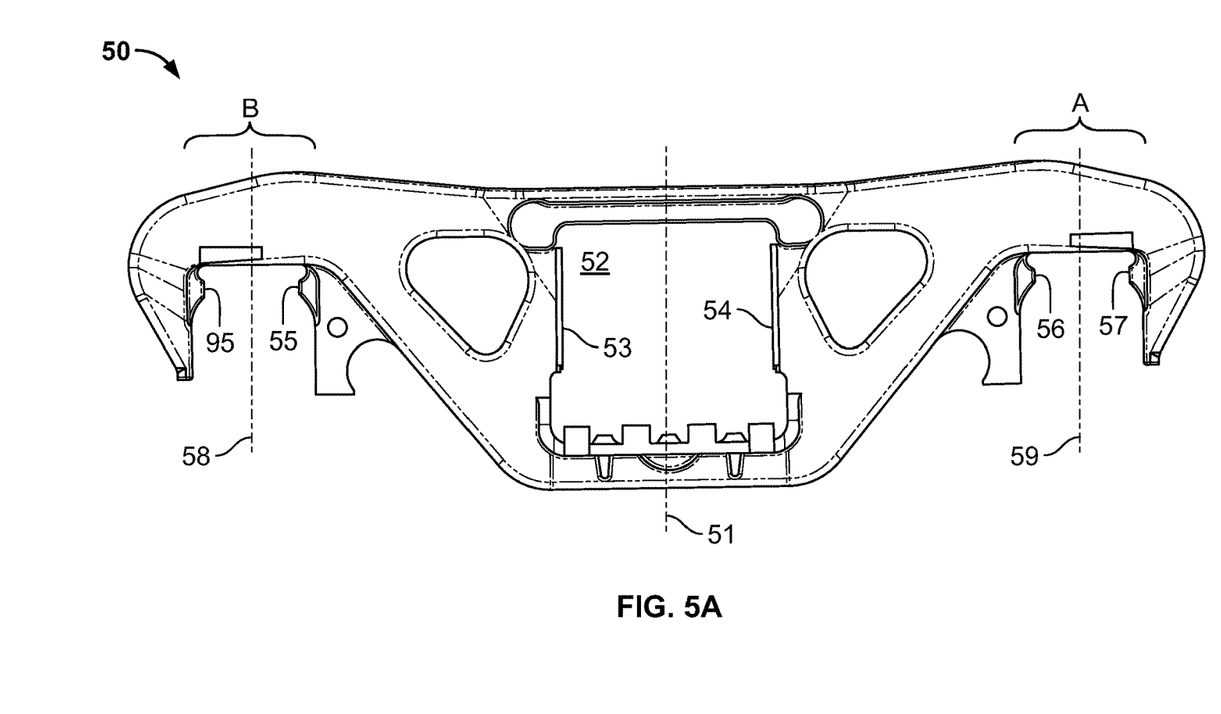
FIG. 5A, FIG. 5B, and FIG. 5C are side elevation, bottom and top views, respectively, of a side frame according to an embodiment of the invention.

To depict reference surfaces and reference surface combinations that may be leveraged to improve truck performance and tolerances, FIG. 5A is a side elevation of side frame 50 from the outer side, including pedestal A having center line 59, pedestal B having center line 58, and side frame window 52 having center line 51. According to embodiments of the invention, side frame window 52, defined by left column 53 and right column 54, with midpoint 51 may be centered with respect to the pedestals, defined by the inner facing thrust lug face 56 and outer facing thrust lug 57 of pedestal A and corresponding facing thrust lug faces 55, 95 of pedestal B. Centering side frame window 52 between the pedestals acts to keep the bolster square to the side frames, maintaining the proper relationship between the side frame columns and the friction castings, or "friction pockets" (43, 46, 47, 48 shown in FIG. 4C) on the bolster. This "spring nest centering" information may be stored in memory 330, 332, 334, updated by processor 32, and used to determine a sequence of material removal and welding operations to recondition a side frame in a method according to the invention.

Figure 5B:
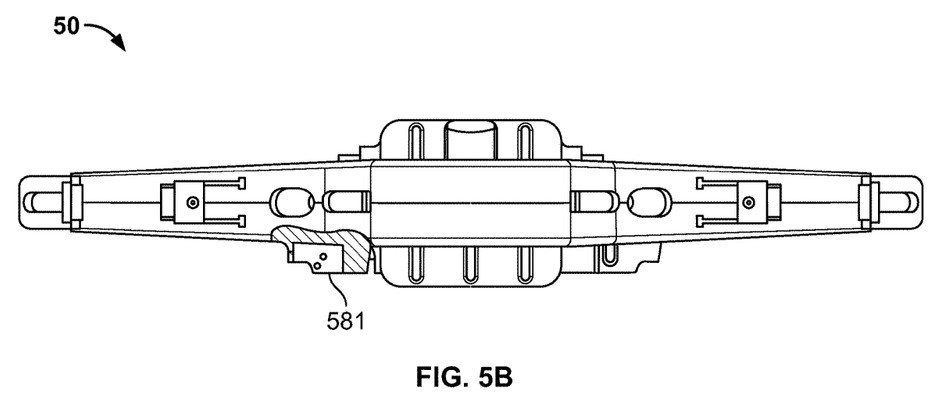
Figure 5C:
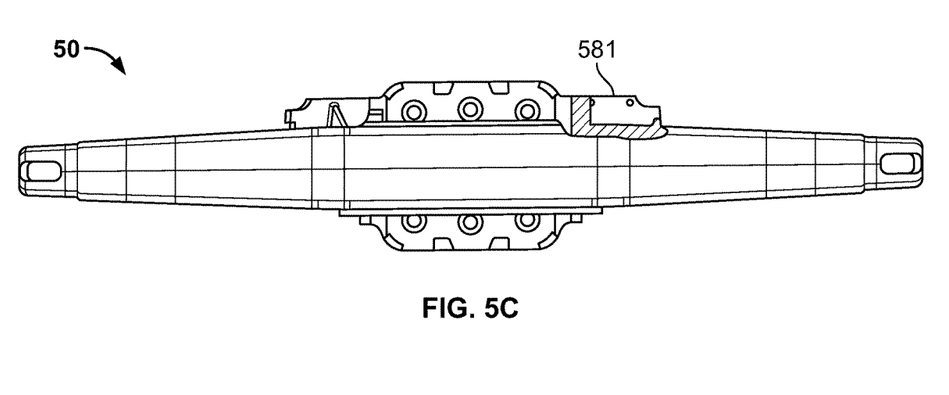

If the side frame window is not on the centerline, the bolster assumes an angle as it sits on the side frames, which may render vertical damping by friction pockets (43, 46, 47, 48 shown in FIG. 4C) on the bolster unpredictable. Using the centering dimensions of the side frame and the pedestal-to-pedestal dimension, instead of relying solely on the length of the side frame, as in the "button system", permits holding the tolerance of a wheelbase measurement to 70 inches+/−0.020 inches. The relationship between thrust lug pairs 56/57 and 55/95 are also more tightly controlled, as explained below. FIG. 5C shows side frame 50 from the top, with a cutaway detail of unit guide pocket 581 adapted to receive the brake beam. FIG. 5B shows side frame 50 from the bottom, with another view of unit guide pocket 581.

Figure 4A:
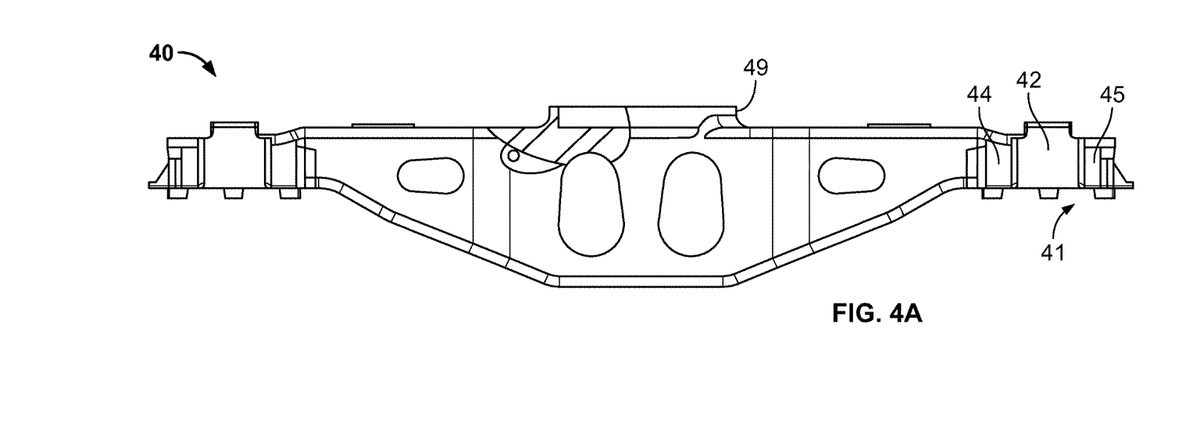
FIG. 4A, FIG. 4B and FIG. 4C are front elevation, top and bottom views of a bolster, respectively, identifying dimensions and surface relationships that can be standardized according to embodiments of the invention.
Figure 4B:
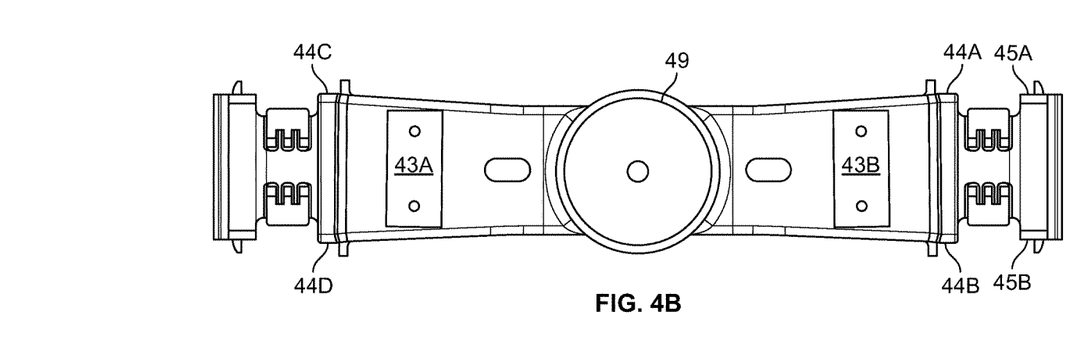

Reference surface combinations on the bolster may also be leveraged to yield improved performance. FIG. 4A is a front view of a bolster 40, including spring seat 41, friction pocket 42, outer lands 45, and inner lands 44. Each lateral end of the bolster (lateral in terms of the orientation of the railway car) is substantially identical. FIG. 4B is a top view, and distinguishes opposed sides of inner lands 44A, 44B, as well as opposed sides of outer lands 45A, 45B. FIG. 4C is a bottom view and shows the sloped surfaces of friction pockets 43, 46, 47, and 48

Referring to FIG. 4B, a reference surface combination ensures angular alignment between bolster center plate 49 and side bearing pads 43A, 43B. Because the car body sits on the surface of center plate 49, this surface sets the angular orientation of the bolster to the rest of the truck. In a method according to the invention, a sequence of material removal and welding steps ensures that the slope of the surface of center plate 49 and the side bearing pads 43A, 44B are aligned to each other and to slope surfaces 43, 46, 47, 48, which ensures that the damping provided by the friction pockets (43, 46, 47, 48) is distributed evenly.

FIG. 4C depicts friction pocket slope surfaces 43, 46, 47, 48. Conventionally, using a gauge, the slope of slope surface 47 could be matched to slope surface 48 on the same end of the bolster and slope surface 43 could be referenced to slope surface 46. But the relationship from one end of the bolster to the other could not be so maintained. The proper orientation of the slope surfaces to the side frame is necessary to ensure that the friction castings provide the correct damping force and that the bolster is oriented correctly on the side frame. Thus, according to the invention, a reference surface combination is made between friction pocket slope surfaces on opposite ends of the bolster. That information is stored in memory 33, may be associated with a particular bolster, and may be updated by processor 32 to ensure that friction pocket slope surfaces are machined or welded with reference to a corresponding surface on the opposite side of the bolster. (It will be apparent from the foregoing discussion that reference numeral 42 refers to a friction pocket, bounded by side walls and a slope surface, while reference numerals 43, 46, 47, and 48 may refer to the friction pockets or to the slope surfaces of the respective friction pockets. The arrangement of each of the four friction pockets on a bolster is substantially identical.)

FIGS. 4A and 4B depict the relationship between inner lands 44 and outer lands 45 on opposite sides of the friction pocket 42. Conventional rebuilding practices used a gauge to maintain a specified distance between the inner and outer lands on either side of friction pocket 42, i.e., between 44A and 45A, and between 44B and 45B. However, during a brake application or any other longitudinal load that causes the car to move longitudinally in relation to the side frames, the bolster inner lands can engage the side frame columns. If the bolster is not perpendicular to the side frames as a result of a poor relationship between surface 44A/44B to 44C/44D, the friction castings can become cocked, adversely affecting the damping and squaring forces that they provide. Thus, controlling the friction pocket dimensions in this way, conforming surfaces of lands 44A, 44B on opposite sides of the longitudinal axis of the bolster, according to embodiments of the invention, results in tighter tolerances and improved truck performance.

A poor relationship between the lands on opposite ends of the bolster, for example between 44C and 44A in FIG. 4B, may also result in poor performance of the vertical damping system and reduce the ability of the bolster to maintain the angular relationship between the bolster and side frames. Significant improvement in performance is achieved where reference surfaces are established on opposite sides of the bolster. The alignment of a reference surface combination between corresponding inner lands on opposite longitudinal ends of the bolster may be stored in memory 33, updated by processor 32, and generally used to determine a sequence of material removal and welding operations for reconditioning a bolster.

The typical width of the bolster pockets at all four locations on a bolster after installation of a side wall wear plate is 6.875 inches+/−0.063. The standard width of a friction casting which fits inside the pocket is 6.500 inches. Using friction pocket walls on opposite ends of a bolster as reference surface combinations, and using reference surface combinations on opposite sides of the longitudinal axis of the bolster, enables the width of the pockets to be standardized to 6.625 inches+/−0.030 inches. Tightening the width of the pockets and reducing the tolerance of the dimensions in the friction pockets ensures that the friction casting is not able to rotate within the pocket, which may cause a friction casting to become cocked and adversely affect the damping and squaring forces that they provide.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Features of the invention described with reference to one embodiment may be combined with a different embodiment without departing from the scope of the invention. Likewise, a feature set forth in a dependent claim may be combined with a different independent or dependent claim(s) without departing from the scope of the invention.

The invention claimed is:

1. An apparatus for manufacturing or reconditioning a railway car part comprising:
    a material removal robot having a head adapted to mount a tool;
    a tool changer comprising a plurality of tools adapted to be mounted on the head, including at least a material removal tool;
    part positioning equipment adapted to support a railway car part and rotate the railway car part around a longitudinal axis of the railway car part;
    a track adapted to translate the material removal robot or the railway car part positioning equipment along the longitudinal axis of the railway car part to position the tool at a plurality of positions along the entire length of the railway car part;
    a user interface adapted to be manipulated by a user;
    a computer readable medium adapted to contain a digital map of dimensions of the railway car part;
    wherein the tool changer comprises at least one measurement tool and at least one material removal tool, both the measurement tool and the at least one material removal tool are adapted to be located by, and mounted on the head of, the material removal robot; wherein
    the head on the material removal robot is a spindle head adapted to mount the measurement tool and said at least one material removal tool; and wherein
    the apparatus further comprises a welding tool, either (i) included in the tool changer and adapted to be mounted on the head of the material removal robot; or (ii) mounted on a robot that is separate from the material removal robot; and wherein
    the processor is adapted to determine a sequence of measurement, material removal and welding operations and provide instructions to the material removal robot to carry out said measurement and material removal operations at a plurality of positions along the length of the railway car part.

2. The apparatus according to claim 1, wherein the welding robot is separate from the material removal robot and is adapted to support a welding tool, and wherein the processor is adapted to determine a sequence of measurement, material removal, and welding operations, and is adapted to communicate instructions to the material removal robot to carry out said material removal operations, to said welding robot to carry out said welding operations.

3. The apparatus according to claim 2, further comprising one or more frames adapted to support the welding robot, the material removal robot and the track, and wherein the one or more frames each has a footprint of 83 inches or less in width and 166 inches or less in length and the apparatus is transportable in a standard trucking container.

4. The apparatus according to claim 1, wherein the material removal robot comprises a base, and six variable-length actuators, each said variable-length actuator attached at a first end to the base, and attached at an end opposite said first end to a movable platform providing the head with freedom of rotation about x, y, z, pitch, yaw and roll axes.

5. The apparatus of claim 4, wherein the track is mounted on a frame and supports the material removal robot.

6. The apparatus according to claim 1, wherein the railway car part is a railway car side frame or bolster.

7. The apparatus according to claim 6, wherein the side frame or bolster has identifying indicia, and the apparatus further comprises an identifying indicia reader adapted to read the identifying indicia, and an identifying indicia writer adapted to write identifying indicia; wherein the processor is adapted to
  record dimensions of the side frame or bolster in memory and associate said dimensions with said identifying indicia; and
  update identifying indicia after said welding and material removal operations are performed, and
  write updated identifying indicia.

8. The apparatus of claim 7, wherein the identifying indicia is on a sticker applied to the side frame or bolster, and the identifying indicia writer is a printer adapted to apply indicia on a sticker.

9. The apparatus of claim 7, wherein the identifying indicia is stored on the computer readable medium.

10. The apparatus of claim 1, wherein the user interface further comprises a touch screen or computer screen display.

11. The apparatus of claim 1, wherein the railway car part is a side frame, and wherein the apparatus further comprises a memory adapted to store identifying information about the source of the side frame, pedestal-to-pedestal dimensions of the side frame, and spring seat centering dimensions of the side frame.

12. The apparatus of claim 1, wherein the railway car part is a bolster and wherein the apparatus further comprises a memory adapted to store identifying information about the source of the bolster and the friction pocket dimensions of the bolster.

13. The apparatus of claim 1, wherein the measurement tool is a touch probe, light probe or laser scanner, and wherein the tool changer comprises at least a shell mill tool, and a face mill tool.

14. A method for reconditioning a railway car side frame or bolster, comprising:
  loading a railway car side frame or bolster onto automated part positioning equipment positioned to provide a welding tool head and a material removal tool head mounted on one or more welding robot or material removal robot access along the length of the side frame or bolster;
  measuring the side frame or bolster with an automated measurement tool mounted on said one or more robots and, using a processor, storing dimensions obtained from said measuring in memory;
  determining a sequence of welding and material removal operations to be performed;
  translating the material removal robot or the part positioning equipment along the longitudinal axis of the railway car side frame or bolster to position the welding tool head and the material removal tool head at a plurality of positions along the entire length of the railway car side frame or bolster;
  performing welding operations at a plurality of different positions of the railway car side frame or bolster and at different positions along the length of said railway car side frame or bolster; and
  performing material removal operations at a plurality of different positions of the railway car side frame or bolster and at different positions along the length of said railway car side frame or bolster, wherein
  said welding operations are performed by the welding robot having a welding head and having a fixed base separate from the material removal robot; and
  said material removal operations are performed by the material removal robot adapted to translate along the length of the side fame or bolster, said material removal robot comprising a base, and six variable-length actuators each attached at a first end to the base, and attached at an end opposite said first end to a movable platform; and wherein a material removal tool on the spindle head of the material robot is rotated about x, y, z, pitch, yaw and roll axes to perform said material removal operations.

15. The method according to claim 14, further comprising reading identifying indicia affixed to the part, associating said identifying indicia with dimensions for the part, and updating said dimensions associated with said identifying indicia after said welding and material removal operations are performed; and wherein said dimensions are selected from the group consisting of:
  (a) spring seat centering dimensions of a side frame;
  (b) pedestal-to-pedestal dimensions of a side frame;
  (c) width of a bolster friction pocket;
  (d) bolster friction casting pocket angle; and
  (e) combinations thereof.

16. The method according to claim 14, further comprising applying updated identifying information on the side frame or bolster.

17. An apparatus for reconditioning a railway car part, comprising:
  a welding robot having a fixed base and a welding head;
  a material removal robot having a base adapted to translate along a length of the railway car part, and having a spindle head adapted to mount a plurality of tools;
  at least one frame arranged on the floor on which the welding robot and material removal robot are mounted
  a tool array consisting of a plurality of tools, including at least one measurement tool and at least one material removal tool;
  a trunnion adapted to support a railway car part and rotate the part around a longitudinal axis of the part;
  a track adapted to support the material removal robot during translation along the length of the part;
  a user interface adapted to be manipulated by a user and having a display adapted to be viewed by a user;
  a processor adapted to determine a sequence of welding and machining operations and adapted to provide instructions to the welding robot and the material removal robot to: (a) locate and mount a tool from said tool array, (b) carry out said welding and machining operations at a plurality of positions along the length of the part; and (c) record dimensions of the part in memory, and
  wherein the welding robot is separate from the material removal robot and adapted to support a welding tool, and wherein the processor is adapted to determine a sequence of measurement, material removal, and welding operations, and is adapted to communicate instructions to the material removal robot to carry out said material removal operations, to said welding robot to carry out said welding operations.

* * * * *